United States Patent
Bartlechner et al.

(10) Patent No.: US 11,725,923 B2
(45) Date of Patent: Aug. 15, 2023

(54) METHOD FOR POSITIONING A BODY HAVING AN ANGLE SCALE

(71) Applicant: DR. JOHANNES HEIDENHAIN GmbH, Traunreut (DE)

(72) Inventors: Alois Bartlechner, Palling (DE); Sebastian Gruber, Kirchdorf (DE); Jürgen Hertenberger, Aich (DE); Karsten Sändig, Palling (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 0 days.

(21) Appl. No.: 17/830,844

(22) Filed: Jun. 2, 2022

(65) Prior Publication Data

US 2022/0390221 A1 Dec. 8, 2022

(30) Foreign Application Priority Data

Jun. 7, 2021 (EP) ..................................... 21177908

(51) Int. Cl.
*G01B 5/25* (2006.01)
*G01B 3/22* (2006.01)

(52) U.S. Cl.
CPC .................... *G01B 5/25* (2013.01); *G01B 3/22* (2013.01)

(58) Field of Classification Search
CPC .......... G01B 5/25; G01B 3/22; G01B 21/047; G01B 5/252
See application file for complete search history.

(56) References Cited

U.S. PATENT DOCUMENTS

| 5,918,540 | A | 7/1999 | Fischer | |
| 10,788,306 | B2* | 9/2020 | Grossmann | G01B 5/252 |
| 10,830,569 | B2* | 11/2020 | Maegawa | B23Q 3/186 |
| 11,327,332 | B2* | 5/2022 | Lamontagne | G02B 27/62 |
| 11,486,740 | B2* | 11/2022 | Mitterreiter | G01B 7/31 |

(Continued)

FOREIGN PATENT DOCUMENTS

| CN | 101166954 A | 4/2008 |
| CN | 110553570 A | 12/2019 |

(Continued)

OTHER PUBLICATIONS

European Search Report issued in corresponding EP Application No. 21177908.7 dated Nov. 2, 2021, pp. 1-2.

*Primary Examiner* — Yaritza Guadalupe-McCall
(74) *Attorney, Agent, or Firm* — Carter, Deluca & Farrell LLP

(57) ABSTRACT

A method for positioning a body that has a surface extending along a circular arc, includes: attaching the body to a machine part that is capable of swiveling; attaching a stationary, first distance gauge; attaching a stationary, second distance gauge; determining three first distance values and three second distance values at three defined angular positions of the machine part different from each other; calculating a first offset value, based on the three first distance values and the corresponding angular positions, and a second offset value, based on the three second distance values and the corresponding angular positions; shifting the body relative to the machine part, until the first offset value is determined by the first distance gauge and the second offset value is determined by the second distance gauge within permissible tolerances.

20 Claims, 2 Drawing Sheets

(56) References Cited

U.S. PATENT DOCUMENTS

| | | |
|---|---|---|
| 2009/0095892 A1 | 4/2009 | Summers et al. |
| 2019/0113323 A1* | 4/2019 | Maegawa ............... B23Q 17/22 |
| 2021/0254956 A1* | 8/2021 | Maegawa ................ G01B 5/25 |
| 2022/0282999 A1* | 9/2022 | Haible ............... G01D 5/34776 |
| 2022/0390221 A1* | 12/2022 | Bartlechner ............. G01B 5/25 |

FOREIGN PATENT DOCUMENTS

| | | |
|---|---|---|
| EP | 0792059 A1 | 8/1997 |
| WO | 2006114602 A1 | 11/2006 |

\* cited by examiner

METHOD FOR POSITIONING A BODY HAVING AN ANGLE SCALE

CROSS-REFERENCE TO RELATED APPLICATIONS

The present application claims priority to Application No. 21177908.7, filed in the European Patent Office on Jun. 7, 2021, which is expressly incorporated herein in its entirety by reference thereto.

FIELD OF THE INVENTION

The present invention relates to a method for positioning, e.g., for centrally aligning, a body having an angular scale, which may be used, for example, as a measuring standard in angular measuring systems.

BACKGROUND INFORMATION

Angular measuring systems are used, for example, to measure angular motions and/or rotational positions of a machine part, for example, a shaft. In this context, the angular motion is measured either incrementally or absolutely. The measured value outputted is, e.g., a sequence of counting pulses, a counter value, or a code word. Corresponding angular measuring systems are used, for example, in machine tools for the measurement of swiveling motions, where the absolute accuracy of the measurement results of an angular measuring system are of great importance. The results of the measurement may be used in correction methods, which are implemented, for example, in a control system of the machine tool.

The accuracy of an angular measurement is influenced considerably by the quality of the angular scale and by the eccentricity of the angular scale with respect to the actual axis of rotation.

A method for concentrically positioning two machine parts on a machine tool is described in European Patent Document No. 3 453 487 and U.S. Patent Application Publication No. 2019/0078868. A single dial gauge, which is swiveled about an axis in a plurality of measuring positions, is used in that method. The measured values ascertained at the plurality of measuring positions are calculated such that sets of information as to how a tail spindle is to be shifted and/or swiveled until it is positioned centrally with respect to the axis are provided.

A disadvantage of this method is that the dial gauge must be moved exactly on a circular line, concentrically about the axis.

SUMMARY

Example embodiments of the present invention provide a method of positioning a body having an angular scale, in which a simple and precise attachment of the body is possible, even if the body and/or the angular scale is not rotatable by a full 360° during the alignment.

According to an example embodiment of the present invention, a body includes an angular scale and a surface extending along a circular arc, and a method that is used for positioning the body includes attaching the body to a machine part that is swivelable about a stationary axis. The method also includes attaching and/or mounting a stationary, first distance gauge, so that a first value of a distance between a first stationary point and a point on the surface of the body may be determined, and attaching and/or mounting a stationary, second distance gauge, so that a second value of a distance between a second stationary point and a further point on the surface of the body may be determined. With respect to the surface of the body, the first distance gauge is positioned to be offset relative to the second distance gauge, in the circumferential direction, by an angle. The method also includes determining three first distance values in three specific angular positions of the machine part different from each other, using the first distance gauge, and determining (e.g., simultaneously) three second distance values in three angular positions of the machine part. In the foregoing step, the machine part is swiveled precisely into the respective angular position, so that distance values are measured for three pairs of points arranged on the surface. A first offset is calculated on the basis of the three first distance values and the corresponding angular positions, and a second offset value is calculated on the basis of the three second distance values and the angular positions. The method further includes shifting the body relative to the machine part, e.g., so far and such that both the first offset value and the second offset value are outputted, e.g., determined, by the first distance gauge and the second distance gauge, respectively, within permissible tolerances.

It should be appreciated that stationary may be understood, for example, as immobile and may refer to an immobility relative to the foundation of a machine of the machine part.

The distance values constitute the distance between points on the surface and, in each instance, a stationary point. The surface may be understood as, for example, the outer surface of a cylindrical body. In the case of a hollow cylindrical and/or annular body, the inner concave surface, which extends along a circular arc, may also be understood to be a surface.

The body may take the form of an annulus. In the following description, the body does not necessarily have to have a surface extending 360° around. The body may have an open shape, e.g., may take the form of an annular segment, so that the surface is not completely circular.

The body may have the angular scale on its exterior side.

The method may be used, for example, in a system in which the ability of the machine part to swivel or pivot is limited to an angular range that is less than 360°, e.g., less than 270°, less than 180°, etc.

The three angular positions of the machine part may be arranged in an angular segment that extends over at least 33% of the angular range of swiveling ability. For example, the three angular positions may be selected to be located in an angular segment that extends over at least 33% of the angular range. The angular segment may extend over at least 50% of the angular range.

The three angular positions of the machine part may be arranged in an angular section that extends less than 180°, e.g., less than 100°.

The angle, by which the first distance gauge is offset relative to the second distance gauge in the circumferential direction, with regard to the surface of the body, may be at least 20°, at least 30°, at least 45°, etc.

The first distance gauge may take the form of a contact-type measuring device. Alternatively, or in addition, the second distance gauge may take the form of a contact-type measuring device. The contact-type measuring device may take the form of, e.g., a dial gauge or a measuring probe. Such devices include, for example, a measuring stem, which is supported displaceably in the housing of the distance gauge and/or dial gauge. The attachment and/or mounting of the two distance gauges is performed such that the longitudinal axes of the measuring stems are oriented in the direction of the second axis, about which the machine part may be swiveled.

As an alternative to a contact-type measuring device, the first distance gauge and/or the second distance gauge may take the form of a non-contact distance-measuring device.

When the method described herein is concluded, the body having the angular scale is precisely aligned and/or centered, so that the attachment in this position meets the condition for an angular measurement of high quality.

It should be appreciated that the method described herein is not limited to use with bodies that are cylindrical or annular. For example, the body may also take the form of a ring segment, for example, since the rotational position of a machine part is often not measured over a full revolution of the machine part.

Example embodiments of the present invention have the advantage that the positioning is simplified considerably for the user of such an angle-measuring device, so that, for example, the user does not have to possess complex mounting equipment, particularly if the ability of the machine part to swivel is limited to a comparatively small angular range.

Further features and aspects of example embodiments of the present invention are described in more detail below with reference to the appended schematic Figures.

DETAILED DESCRIPTION

Figure 1:
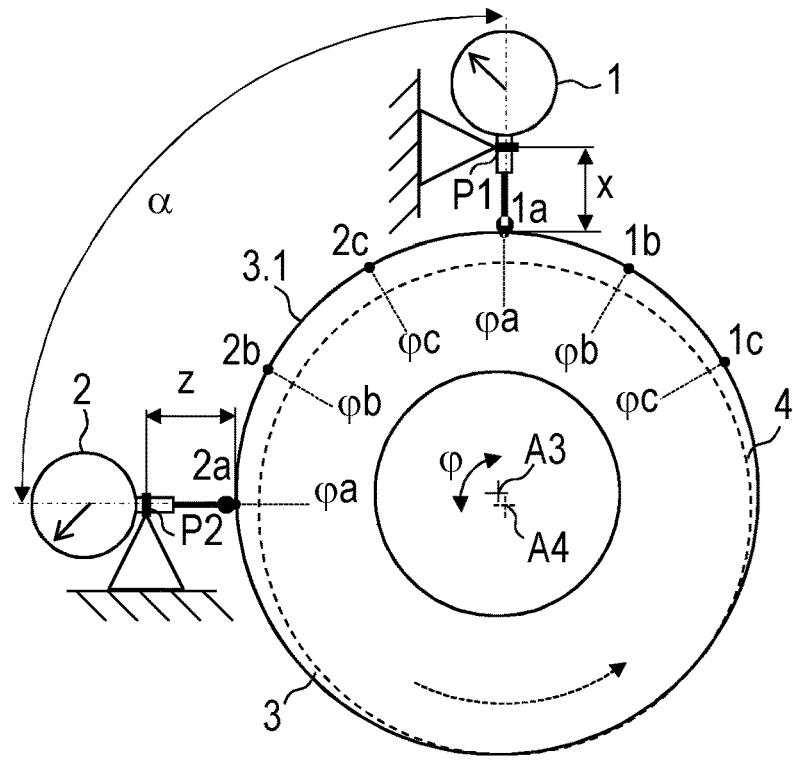
FIG. 1 schematically illustrate distance gauges and a body at the start of the positioning operation.

As schematically illustrated in FIG. 1, a body 3, which, for example, takes the form of an annular body, is attached to a machine part 4 and centered. Body 3 is precisely manufactured with the aid of a turning or grinding method, so that surface 3.1 extends extremely accurately along a circular arc, about a first axis A3. An angular scale is applied to surface 3.1. In the illustrated exemplary embodiment, it is an angular scale that is able to be read out optically and has reflective marks and non-reflective marks. Body 3 belongs to a modular angular measuring system, in which the angular scale is able to be sensed, and a highly accurate value of an angular position is able to be ascertained.

Machine part 4 may be, for example, a shaft of a swivel table of a machine tool. Machine part 4 may be swiveled about a second axis A4 by an angle $\varphi$. In the illustrated exemplary embodiment represented, machine part 4 is able to swivel at a maximum, displaceable angular range $\varphi S$ (see, e.g., FIG. 2) of 90°. Second axis A4 is stationary. The accuracy of the swivel kinematics is intended to be checked and quantitatively measured with the aid of the body 3 having the angular scale. The machine tool has an independent angular-position measuring device which is able to measure the angular position of machine part 4 with respect to second axis A4.

During the mounting of body 3, body 3 is initially attached to the machine part 4 capable of swiveling. For example, body 3 is fastened to machine part 4 by a spring-loaded screw connection such that it is fixed securely in position relative to machine part 4 but may still be shifted in a plane perpendicular to axis A4, by exerting a comparatively small force. After this first fixation, first axis A3 and second axis A4 are generally not coincident, which means that body 3 is positioned to have a certain eccentricity relative to second axis A4, e.g., relative to machine part 4. When assembling such a modular angular measuring system by the user, care must be taken that body 3 is positioned exactly on the machine part 4.

In the next step, a first distance gauge 1 is attached in a stationary manner in the vicinity of surface 3.1, such that a first value of the distance x between surface 3.1 of body 3 and a first stationary point P1 may be determined. In the illustrated exemplary embodiment, first distance gauge 1 is a dial gauge or a so-called measuring probe. Using such a distance gauge 1, distances and/or changes in distance may be determined at a resolution in the micrometer range.

With regard to the surface 3.1 of body 3, a second distance gauge 2 is mounted in a stationary manner, offset relative to first distance gauge 1 in the circumferential direction by an angle $\alpha$ (e.g., $\alpha=90°$). Second distance gauge 2 is positioned such that a second value of the distance z between a second stationary point P2 and surface 3.1 of body 3 may be determined. In the illustrated exemplary embodiment, second distance gauge 2 also takes the form of a dial gauge and has the same high measurement accuracy as first distance gauge 1.

Body 3 is brought into a position as illustrated in FIG. 1. Accordingly, in this position, which may also be defined by angular position $\varphi a$, the value of distance x1a between first stationary point P1 and a point 1a on surface 3.1 is determined by first distance gauge 1. At the same time, the value of distance z1a between second stationary point P2 and a further point 2a on surface 3.1 is determined by second distance gauge 2. Thereafter, machine part 4 is swiveled or pivoted, together with body 3, about second axis A4 by a predefined angle, e.g., 30°. Swivel or pivot angle $\varphi$ may be determined with sufficient accuracy, for example, with the aid of the angular-position measuring device of the machine tool already present. In this second angular position $\varphi b$, the values of distance x1b, z2b from points 1b and 2b are ascertained. Machine part 4 is then swiveled once again with body 3 about second axis A4 by a predefined angle, which is, for example, 30° in the illustrated exemplary embodiment. In this position, machine part 4 is arranged with body 3 in the third angular position $\varphi$. In this position, values of distance x1c, z2c are also determined.

As an alternative to using an angular-position measuring device, markings may be applied to body 3 or to machine part 4 in defined and known angular spacings, and the markings are able to be stopped at in succession.

Thus, in each angular position $\varphi a$, $\varphi b$, $\varphi c$, a pair of distance values x1a, z2a; x1b, z2b; x1c, z2c are determined.

After these measurements, both three first distance values x1a, x1b, x1c and three second distance values z2a, z2b, z2c are determined at three defined angular positions $\varphi a$, $\varphi b$, $\varphi c$ of machine part 4 different from each other. As an example, the following information items are determined:

| Angular Position | First Distance Value | Second Distance Value |
|---|---|---|
| $\varphi a = 0°$ | x1a = 2495 μm | z2a = 2182 μm |
| $\varphi b = 30°$ | x1b = 2276 μm | z2b = 2651 μm |
| $\varphi c = 60°$ | x1c = 1852 μm | z2c = 2948 μm |

Figure 2:
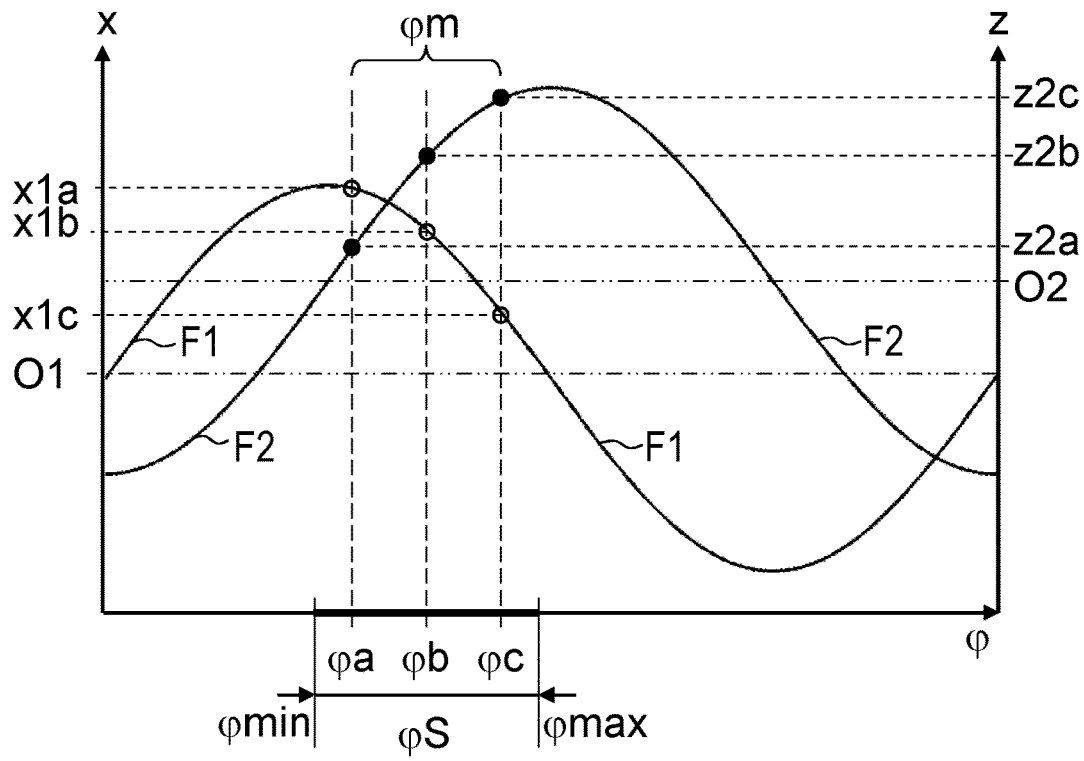
FIG. 2 schematically illustrates measured distance values and calculated offset values.
Figure 3:
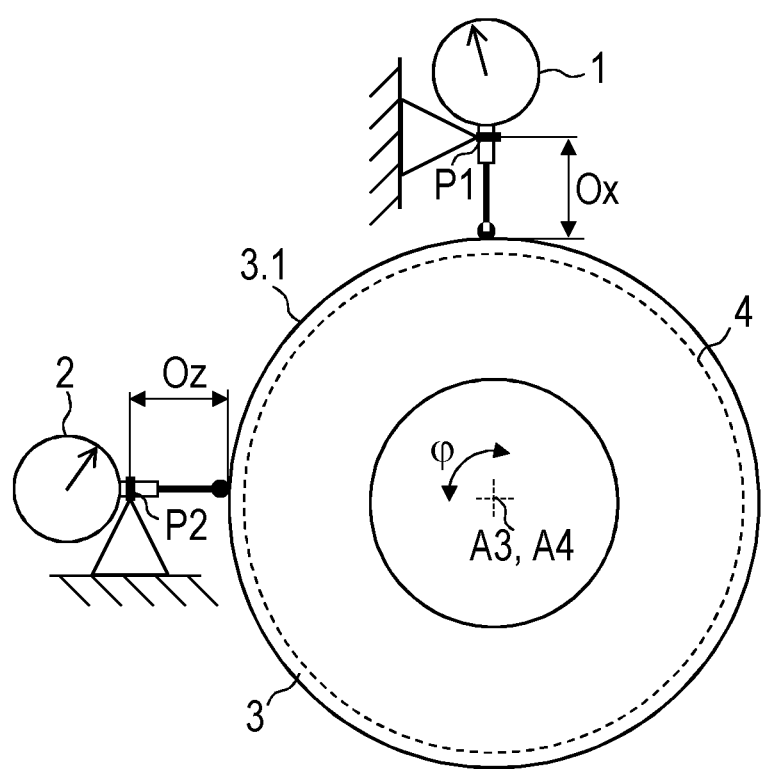
FIG. 3 schematically illustrates the distance gauges and the body at the end of the positioning operation.

The three angular positions $\varphi a$, $\varphi b$, $\varphi c$ of machine part 4 are located in an angular segment $\varphi m$, which, in this example, extends 60° (see, e.g., FIG. 2). In other words, the maximum difference between two angular positions $\varphi a$, $\varphi b$, $\varphi c$ is the difference $\varphi c - \varphi a = \varphi m$. This difference is 60° ($\varphi b - \varphi a = 30°$ and is therefore less than $\varphi c - \varphi a$). As already mentioned above, the ability of machine part 4 to swivel is limited to an angular range $\varphi S = 90°$, which, as illustrated in FIG. 2, extends between terminal angular positions $\varphi min$ and $\varphi max$ ($\varphi S = \varphi max - \varphi min$). The three angular positions $\varphi a$, $\varphi b$, $\varphi c$ of machine part 4 are located in the angular segment $\varphi m$ of 60°, which means that this extends over 66.67% of angular range $\varphi S$ ($\varphi m/\varphi S = 60°/90° = 66.67\%$).

With the aid of a regression calculation, a first sinusoidal function F1 is determined on the basis of first distance values $x1a$, $x1b$, $x1c$ and angular positions $\varphi a$, $\varphi b$, $\varphi c$ (see, e.g., FIG. 2). In the same manner, a second sinusoidal function F2 is determined on the basis of second distance values $z2a$, $z2b$, $z2c$ and angular positions $\varphi a$, $\varphi b$, $\varphi c$, using the same method. A first offset value O1 may be calculated for first sinusoidal function F1, and a second offset value O2 may be calculated for second sinusoidal function F2. Offset values O1, O2 correspond to the respective zero lines of the two sinusoidal functions F1, F2. Therefore, sinusoidal functions F1, F2 enclose areas of equal value above corresponding offset values O1, O2 and below corresponding offset values O1, O2, respectively. As illustrated in FIG. 2, this visual observation is applicable to a full period of sinusoidal functions F1, F2.

The following offset values O1, O2 are ascertained in the exemplary embodiment described above:

| Offset Value | |
| --- | --- |
| O1 = 1511 µm | O2 = 2009 µm |

Body 3 is shifted relative to machine part 4 (for example, by tapping it with a suitable tool) such that the displays of distance gauges 1, 2 indicate values that approach offset values O1, O2. In the method, it is comparatively simple for the operator to identify the effective shifting direction. As soon as the two current distance values correspond to offset values O1, O2 within permissible tolerances as a result of the shifting of body 3, the body is centered with sufficient accuracy with respect to second axis A4. In this position, body 3 may be connected securely and immovably to machine part 4, for example, by a screw connection.

Thereafter, distance gauges 1, 2 may be removed, and with the aid of the accurately positioned body 3 having the angular scale, the kinematics of the machine tool may be measured accurately at the location of machine part 4.

What is claimed is:

1. A method for positioning a body that includes a surface extending along a circular arc and an angular scale, comprising:
   attaching the body to a machine part that is adapted to pivot about a stationary axis;
   attaching a stationary, first distance gauge adapted to determine a first value of a distance between a first stationary point and the surface of the body;
   attaching a stationary, second distance gauge adapted to determine a second value of a distance between a second stationary point and the surface of the body, the first distance gauge being positioned offset relative to the second distance gauge by an angle in a circumferential direction with respect to the surface of the body;
   determining three first distance values and three second distance values at three predetermined angular positions of the machine part that are different from each other;
   calculating a first offset value based on the three first distance values and corresponding angular positions, and a second offset value based on the three second distance values and the corresponding angular positions; and
   shifting the body relative to the machine part, until the first offset value is output by the first distance gauge and the second offset value is output by the second distance gauge within permissible tolerances.

2. The method according to claim 1, wherein the machine part is adapted to pivot about a limited angular range.

3. The method according to claim 2, wherein the limited angular range is less than 360°.

4. The method according to claim 2, wherein the limited angular range is less than 270°.

5. The method according to claim 1, wherein the three angular positions of the machine part are arranged in an angular segment that extends over at least 33% of the limited angular range.

6. The method according to claim 1, wherein the three angular positions of the machine part are arranged in an angular segment that extends less than 180°.

7. The method according to claim 1, wherein the angle is at least 20°.

8. The method according to claim 1, wherein the first distance gauge is arranged as a contact-type measurement device.

9. The method according to claim 8, wherein the second distance gauge is arranged as a contact-type measurement device.

10. The method according to claim 1, wherein the second distance gauge is arranged as a contact-type measurement device.

11. The method according to claim 1, wherein the body is annular.

12. The method according to claim 1, wherein the angular scale is arranged on an outer circumference of the body.

13. The method according to claim 1, wherein the first offset value is calculated based a first sinusoidal function determined from the first distance values and the corresponding angular positions, and the second offset value is calculated based on a second sinusoidal function determined from the second distance values and the corresponding angular positions.

14. The method according to claim 13, wherein the first sinusoidal function and the second sinusoidal function are determined in accordance with a regression calculation.

15. The method according to claim 1, wherein the first and second distance gauges are removed after the shifting.

16. The method according to claim 1, wherein the angle is at least 30° and/or at least 45°.

17. The method according to claim 1, wherein the angular scale includes reflective and non-reflective regions adapted to be read optically.

18. The method according to claim 1, wherein the body is arranged as a component of an angular measurement system.

19. The method according to claim 1, wherein the body is fixed immovably relative to the machine part after the shifting.

20. The method according to claim 1, wherein the first distance gauge and/or the second distance gauge is arranged as a dial gauge and/or a measuring probe.

* * * * *